UNITED STATES PATENT OFFICE.

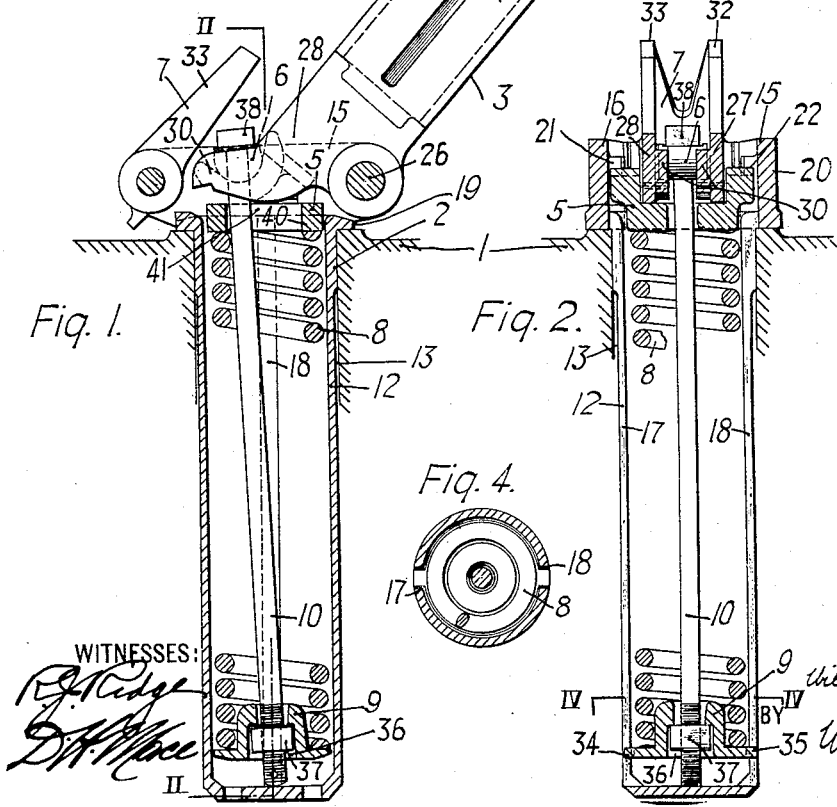

WILLIAM SCHAAKE, OF PITTSBURGH, PENNSYLVANIA, ASSIGNOR TO WESTINGHOUSE ELECTRIC AND MANUFACTURING COMPANY, A CORPORATION OF PENNSYLVANIA.

TROLLEY-SUPPORTING MECHANISM.

1,175,305.  Specification of Letters Patent. Patented Mar. 14, 1916.

Application filed June 5, 1913. Serial No. 771,870.

*To all whom it may concern:*

Be it known that I, WILLIAM SCHAAKE, a citizen of the United States, and a resident of Pittsburgh, in the county of Allegheny and State of Pennsylvania, have invented a new and useful Improvement in Trolley-Supporting Mechanism, of which the following is a specification.

My invention relates to trolley supporting mechanisms, and it has special reference to trolley bases of the type commonly employed upon mining locomotives or similar vehicles where the head room is limited.

One object of my invention is to provide a simple and compact structure of the class above indicated having relatively few parts which are so fashioned and shaped as to coöperate, the one with the other, in such manner as to provide a single unitary structure, the parts being held together without the usual bolts and screws.

Another object of my invention is to provide a trolley base substantially all parts of which may conveniently constitute castings upon which no machine work is necessary and which may be readily assembled and taken apart.

A still further object of my invention is to provide means for adjusting the tension of the actuating spring which shall be located in a convenient position where it is readily accessible to the operator without taking the device apart.

My invention is illustrated in the accompanying drawing, in which—

Figure 1 is a view, partially in section and partially in side elevation, of a trolley-supporting mechanism constructed in accordance with my invention; Fig. 2 is a similar view of the device shown in Fig. 1, the section being taken along the line II—II of Fig. 1; Fig. 3 is a plan view of a portion of the mechanism; Fig. 4 is a sectional view of certain parts, taken along the line IV—IV of Fig. 2 and Figs. 5 and 6 are, respectively, a plan view and a sectional view of one of the parts of the device.

Referring to the drawing, the device here shown comprises a portion 1 of a locomotive or other vehicle, a base 2, a pole socket 3, a trolley pole 4, a spring stop or pressure member 5, a gib member 6, a latching member 7, an actuating spring 8, a spring seat 9 and a tension rod 10.

The base 2 comprises a cylindrical bearing and spring receiving member 12 which is adapted for rotatable movement within an opening 13 in the body portion 1 of the vehicle and is provided, at its upper end, with a plurality of substantially parallel supporting members 15 and 16 forming integral parts thereof. The cylindrical bearing member 12 is provided with oppositely disposed longitudinal openings or slots 17 and 18 extending the entire length of the member, and also with an upper outwardly projecting flange 19 adapted to rest upon the body portion 1 and to turn thereon. The supporting members 15 and 16 are oppositely curved and of like construction and each comprises essentially a central portion 20 of cylindrical contour having an inwardly projecting flange 21 which is provided with a central opening or slot 22 to receive a member to be hereinafter described.

The pole socket 3 may be of any suitable construction to receive and clamp the pole 4 which is provided with a trolley harp 24 and wheel 25, according to the usual practice. The pole socket 3, moreover, is pivotally mounted upon a pin or shaft 26 that is supported between the members 15 and 16 and is provided with parallel projecting arms 27 and 28, each of which has a curved bearing member 30 formed integral therewith and adapted to receive the ends of the gib member 6. The relative proportions and arrangement of parts is so chosen that the gib member 6 is disposed over the cylindrical spring-receiving or bearing member 12. The bifurcated latch member 7 embodies a plurality of arms 32 and 33, the ends of which coöperate with the ends of the projecting arms 27 and 28 when the trolley 4 is in its lowest position for the purpose of restraining it.

The actuating spring 8 is disposed within the bearing sleeve 12 and its lower end is adapted to rest upon the spring seat 9 which is provided with oppositely disposed portions 34 and 35 which are, respectively, adapted to project into the slots or openings 17 and 18 for the purpose of preventing any rotative movement of the seat 9. It will be understood, therefore, that the seat 9 is adapted to have longitudinal movement only. Moreover, the member 9 has a rectangular lower recess 36 to receive a rectangular nut 37 and to prevent the same from turning. The lower end of the tension member or rod 10 has a screw-threaded engagement with the nut 37 and its upper end projects through an opening in the gib 6 and is held in position with respect thereto by an integrally formed head 38.

The spring 8 surrounds the tension rod 10 and its upper end is adapted to engage the spring-stop or pressure member 5 which constitutes a substantially disk-like portion 40 having a central elongated recess or opening 41 and provided at opposite sides with upwardly and outwardly projecting members 42 which, respectively, are provided with a centrally disposed rib 43. When the several parts of the device are assembled, the portions 42 of the spring stop 5 bear against the inwardly projecting flanges 21 of the supporting members 15 and 16, and the ribs 43 project upwardly into the openings 22 and thereby maintain the member 5 in position. Obviously, the opening 41 is to accommodate the tension rod 10 and is, therefore, parallel to the arms 27 and 28 of the pole socket 3.

Assuming the various parts to occupy the positions shown in Fig. 1, it is evident that the actuating spring 8, being positively restrained at its upper end, exerts a pressure upon the spring seat 9 and thus maintains the trolley wheel 25 under pressure in engagement with a trolley conductor (not shown) through the agency of the tension rod 10, the gib 6 and pivotally mounted pole socket 3.

In case it is desired to lower the pole 4, it is only necessary to force it downwardly until the latch 7 engages the ends of the projecting arms 27 and 28. Under these conditions the spring 8 is fully compressed and the spring seat 9 is raised to its upper position.

It is frequently desirable to adjust the tension of the actuating spring 8, which may be accomplished very readily merely by turning the rod 10 by means of any suitable implement. In so doing, the rod 10 is moved with respect to the nut 37 by reason of the screw-threaded engagement therewith, and, hence, adjustments of the spring 8 may be effected. As already pointed out, the nut 37 and spring seat 9 are prevented from rotative movement.

If it should be desired to remove the spring 8, the rod 10 is unscrewed until the gib 6 may be slipped free from the curved bearing members 30, after which the spring-stop or pressure member 5 is pressed downwardly until the ribs 23 are below the projecting portions 21. The member 5 may then be moved through an angle of substantially 90 degrees until the portions 42 thereof entirely disengage the projecting members 21, after which, said member 5 may be raised, together with the spring 8, rod 10, gib 6, and spring seat 9 between the supporting members 15 and 16, as will be readily understood.

It will be noted that all of the parts may be cast and that they are fitted together and coöperate with each other to be held in place without requiring any machine work or accessory fastening devices such as screws and nuts, etc.

While the device herein shown and described constitutes what I now consider the preferred form of my invention, I do not wish to be restricted to the specific structural details and arrangement and location of parts, as it is evident that many modifications may be effected therein without departing from the spirit and scope of my invention. I, therefore, desire that only such limitations shall be imposed as are indicated in the appended claims.

I claim as my invention:

1. In a trolley-supporting device, the combination with a cylindrical base having an upper portion for supporting a trolley pole, and spring-actuated means disposed within said cylindrical base and coöperating with said pole, of a removable member of greater length than width adapted to be inserted into the upper portion of said base and to be held in position thereby after being rotated a predetermined degree, said member being adapted to coöperate with said spring-actuated means.

2. In a trolley-supporting device, the combination with a cylindrical base, the upper end of which is provided with oppositely disposed inwardly projecting flanges having transverse slots therein, of a disk member of less diameter than the distance between said flanges and having corresponding outwardly projecting flanges provided with transverse lugs, said disk member being disposed beneath said base flanges and having its flanges in engagement therewith and its transverse lugs disposed in the transverse slots of said base flanges.

3. In a trolley-supporting device, the combination with a cylindrical base, the upper end of which is provided with oppositely disposed upwardly projecting side members severally having outwardly disposed central portions and slotted flanges projecting inwardly from said central portions, of a member adapted to be inserted between said flanges and provided with oppositely disposed outwardly projecting arms adapted to engage the under sides of said flanges after being rotated, said arms having bosses to fit into the slotted flanges.

4. In a trolley-supporting device, the combination with a cylindrical base having a plurality of oppositely disposed inwardly projecting lugs, and a removable member having oppositely disposed outwardly projecting lugs adapted to engage said base lugs, of a pole pivotally associated with said base, and spring-actuated means coöperating therewith and disposed within said cylindrical base and engaging said member.

5. In a trolley-supporting device, the combination with a cylindrical base having a plurality of oppositely disposed inwardly projecting lugs, and a removable member having oppositely disposed outwardly projecting lugs adapted to engage said base lugs, of a coil spring contained within said cylindrical base and adapted to act against said member.

6. In a trolley supporting device, the combination with a cylindrical base having upwardly projecting supporting members, a spring disposed in said base, a pole pivoted between said supporting members, and a pressure member disposed in the upper part of said cylindrical base and adapted to engage the upper end of said spring and to engage and be held in position by said supporting members.

7. A trolley-supporting device comprising a recessed base having an upper portion for supporting a trolley pole, a coil spring disposed in said recessed base and coöperating with said trolley pole, and a movable pressure member of greater length than width and adapted to be inserted into the upper portion of the recessed base and to be held in position by said base after being rotated a portion of a revolution, said member being adapted to coöperate with the upper end of said spring.

In testimony whereof, I have hereunto subscribed my name this 28th day of May, 1913.

WILLIAM SCHAAKE.

Witnesses:
NIK WAHLBERG,
B. B. HINES.

Copies of this patent may be obtained for five cents each, by addressing the "Commissioner of Patents, Washington, D. C."